(12) United States Patent
Taudien et al.

(10) Patent No.: US 11,630,205 B2
(45) Date of Patent: Apr. 18, 2023

(54) ACOUSTIC DUAL-FREQUENCY PHASED ARRAY WITH COMMON BEAM ANGLES

(71) Applicant: Teledyne Instruments, Inc., Thousand Oaks, CA (US)

(72) Inventors: Jerker Taudien, Burlington, VT (US); Steven Webb, La Mesa, CA (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 680 days.

(21) Appl. No.: 16/588,892

(22) Filed: Sep. 30, 2019

(65) Prior Publication Data
US 2021/0173079 A1    Jun. 10, 2021

Related U.S. Application Data

(60) Provisional application No. 62/739,785, filed on Oct. 1, 2018.

(51) Int. Cl.
*G01S 15/89*    (2006.01)
*G10K 11/34*    (2006.01)

(52) U.S. Cl.
CPC ...... *G01S 15/8925* (2013.01); *G01S 15/8927* (2013.01); *G10K 11/346* (2013.01)

(58) Field of Classification Search
CPC .. G01S 15/8925; G01S 15/8927; G01S 15/58; G01S 15/60; G01S 15/107
See application file for complete search history.

(56) References Cited

U.S. PATENT DOCUMENTS

| 4,373,143 | A | * | 2/1983 | Lindberg | B06B 1/0618 |
| | | | | | 310/334 |
| 4,641,291 | A | | 2/1987 | Simmons, Sr. et al. | |
| 5,550,792 | A | | 8/1996 | Crandall et al. | |
| 5,808,967 | A | | 9/1998 | Yu et al. | |
| 5,891,038 | A | | 4/1999 | Seyed-Bolorforosh et al. | |
| 8,514,659 | B2 | | 8/2013 | Vogt | |

(Continued)

FOREIGN PATENT DOCUMENTS

DE    197 56 730 A1    7/1998

OTHER PUBLICATIONS

International Search Report for counterpart PCT application PCT/US2019/53627 dated Jun. 10, 2020.

(Continued)

*Primary Examiner* — Tarun Sinha
(74) *Attorney, Agent, or Firm* — Knobbe, Martens, Olson & Bear, LLP

(57) ABSTRACT

An acoustic dual-frequency phased array system with common beam angles is disclosed. In one aspect, the system includes a planar array of transducer elements and a multiplexing circuit for selecting between a first state and a second state during either transmit operation, receive operation or both transmit and receive operation. The multiplexer is configured to connect transducer elements to a plurality of connections different between the first state and second state. The system is configured to transmit and receive beams at a first frequency when the multiplexer is in the first state and transmit and receive beams at a second frequency when the multiplexer is in the second state. The angle of the beams from vertical in the first and second state are substantially similar.

14 Claims, 15 Drawing Sheets

(56) References Cited

U.S. PATENT DOCUMENTS

| | | |
|---|---|---|
| 10,054,681 B2 | 8/2018 | Rowe et al. |
| 10,698,107 B2 | 6/2020 | Rowe et al. |
| 2010/0074057 A1 | 3/2010 | Bachelor et al. |
| 2010/0142324 A1* | 6/2010 | Vogt ..................... G01C 13/00 367/88 |
| 2013/0058194 A1 | 3/2013 | Vogt |
| 2013/0083621 A1 | 4/2013 | Rikoski |
| 2014/0010048 A1 | 1/2014 | Proctor |
| 2014/0230567 A1* | 8/2014 | Rowe ................... G01S 15/582 367/138 |
| 2016/0325814 A1 | 11/2016 | Antao et al. |

OTHER PUBLICATIONS

European Search Report issued in Application No. EP 19900764.2, dated Mar. 11, 2022.
Partial Supplementary European Search Report received in App. No. EP 19900764.2, dated Nov. 4, 2021.

* cited by examiner

ACOUSTIC DUAL-FREQUENCY PHASED ARRAY WITH COMMON BEAM ANGLES

RELATED APPLICATIONS

This application claims the benefit of U.S. Provisional Application No. 62/739,785, filed Oct. 1, 2018, which is hereby incorporated by reference in its entirety.

BACKGROUND

Field

The disclosed technology relates to underwater acoustic measurement systems and, more particularly, to a phased-array Doppler sonar that operates at two different frequencies.

Description of the Related Technology

Doppler sonars, including Doppler velocity logs (DVL) and acoustic Doppler current profilers (ADCP), measure the relative velocity between an instrument and a group of scatterers by transmitting acoustic pulses along multiple beams that point in different directions and measure the Doppler shift of the acoustic signal that is scattered back towards the instrument in each beam. The group of scatterers can consist of either suspended particles in the water column to measure currents or a boundary surface, for example the ocean floor, to measure velocity over ground. An ADCP measures currents by estimating the Doppler shift of sound scattered from suspended particles in the water column. A DVL measures speed over ground by estimating the Doppler shift of sound scattered from a boundary surface. A common configuration 100 consists of four beams 120a, 120b, 120c and 120d from an instrument 110 separated in azimuth by 90° and elevated from vertical 140 by a common angle referred to as the Janus angle $\alpha_J$ 130, such as is shown in FIG. 1.

The radial Doppler frequency measured by a beam is approximated by $$f_D = \frac{2v_r}{c} f_{tx}, \quad (1)$$

where $v_r$ is the radial velocity, $f_{tx}$ is the transmit frequency, and c is the speed of sound, about 1500 meters/second.

An ADCP is a type of sonar system that is used to remotely measure water velocity over varying ranges. ADCPs are used in freshwater environments such as rivers, lakes and estuaries, as well as in saltwater environments such as the ocean, for studying the effects of current velocities. The measurement of accurate current velocities is important in such diverse fields as weather prediction, biological studies of nutrients, environmental studies of sewage dispersion, and commercial exploration for natural resources, including oil.

Typically, ADCPs are used to measure current velocities in a vertical column of water for each depth "cell" of water up to a maximum range, thus producing a "profile" of water velocities. The general profiler system includes a transducer to generate pulses of sound that backscatter as echoes from plankton, small particles, and small-scale inhomogeneities in the water. The backscattered sound is often received with the same transducer that generated the sound; this configuration is known as a mono-static sonar. The received sound has a Doppler frequency shift proportionate to the relative velocity between the scatters and the transducer.

The physics for determining a single horizontal velocity vector component, $v_x$, in the instrument frame from such a Doppler frequency shift may be concisely stated by the following equation $$v_x = \frac{cf_D}{2f_{tx}\sin(\theta)}, \quad (2)$$

where θ is the acoustic beam angle with respect to vertical. Thus, by knowing the transmitted frequency, $f_{tx}$, the beam angle of the transmitter transducer, and measuring the Doppler shifted frequency, $f_D$, one can determine a velocity vector component. Earth-frame velocity of the measured depth cell, is determined by subtracting out a measurement of platform earth reference velocity, $v_p$. Earth referenced velocity of the platform can be measured by pinging the ocean bottom whenever it comes within sonar range or by a navigation system such as LORAN or GPS.

Commercial Doppler sonars are typically configured as an assembly of four diverging transducers, spaced at 90° azimuth intervals from one another around the electronics housing. This transducer arrangement is known in the technology as the Janus configuration. A three-beam system permits measurements of three velocity components, $v_x$, $v_y$, and $v_z$ (identified respectively as u, v and w in oceanographic literature) under the assumption that currents are uniform in the plane perpendicular to the mutual axis of the transducers. However, four beams are often used for redundancy and reliability, allowing for measuring an error-velocity component, $v_e$, that can be used for quality screening. The Doppler sonar may be attached to the hull of a vessel, remain on stationary buoys, or be moored to the ocean floor.

Of importance to a vessel-mounted ADCP is the accurate determination of vessel velocity. The earth reference water velocities can then be calculated by subtracting out the vessel velocity.

A DVL determines vessel velocity in the earth reference frame by measuring the Doppler shift of sound scattered from a boundary surface, typically the ocean floor. The first step is to detect the echo that corresponds to the boundary surface. The second step is to estimate the Doppler shift of the segment of the echo that corresponds to the detected boundary surface. For navigation purposes, it is desirable to measure the vessel velocity in the earth frame instead of the velocity in the water frame to avoid navigation errors due to currents.

Doppler sonars typically utilize piston or phased-array transducers to both transmit and receive sound. Phased-array transducer can form four Janus beams from a single aperture, while it requires four discrete piston transducers to form four beams. For a given aperture diameter, corresponding to a given beam width, the area of a phased-array transducer is approximately one quarter that of the total area of four piston transducers. Therefore, phased-array transducers are often preferred over piston transducers in applications for which it is important to minimize size.

There is a tradeoff between minimum range and maximum range of operation for a Doppler sonar. Users of DVLs and ADCPs typically want to be able to use a single instrument at very close distances and very far distances. In particular, an instrument operating with a low-frequency signal has relatively low absorption losses and can reach farther out from the instrument than a high frequency signal. However, an instrument operating with a high frequency signal can function closer to the instrument than would otherwise be feasible with a low-frequency signal.

Additionally, for a fixed acoustic frequency there is a tradeoff between resolution, range, and velocity variance. High resolution is achieved by transmitting short pulses, but both range and velocity variance suffer. Alternatively, a long pulse provides longer range and lower velocity variance than a short pulse, but the spatial resolution is reduced. Further, velocity variance can be reduced by temporal averaging, but the tradeoff is reduced temporal resolution. This tradeoff can be shifted to favor higher resolution and lower variance by utilizing a higher frequency or longer range by utilizing a lower frequency.

A 24-element diameter standard phase-array transducer 200 is shown in FIG. 2. Four unique signals 205 labeled A, B, C, and D connect to each side of the transducer 200, but only one side is shown in FIG. 2. This set of four signals 205 is used to transmit and receive two beams contained in one plane and elevated from vertical by the Janus angle. Similarly, another set of four signals from the opposite side of the transducer form another two beams in a plane the is rotated around the center point of the transducer by 90° in azimuth with respect to the first plane. A limitation of this standard phased-array transducer 200 is that it can only operate at one frequency at the nominal Janus angle for a given element pitch. If the frequency is perturbed from the nominal frequency, then the beam angle is also perturbed.

The disclosed development overcomes the fixed frequency of the phased-array transducer and supports two frequencies separated by approximately one octave and the beams corresponding to the two frequencies are formed at approximately the same Janus angle. Therefore, the dual-frequency phased-array is able to combine the benefits of long-range from low frequency operation; and the close profiling, lower variance, and higher resolution of a high frequency system.

SUMMARY OF CERTAIN INVENTIVE ASPECTS

Phased-array transducers, with a given element pitch, have a fixed nominal beam angle for only one nominal frequency. If the frequency is perturbed from the nominal frequency, then the beam angle is also perturbed. The dual-frequency phased-array transducer overcomes the shortcoming of the traditional phased-array transducer by being able to generate acoustic beams of a substantially similar beam angle for two different frequencies approximately one octave apart.

This is accomplished by slicing the array according to λ/2 spacing (or λ/3, λ/4, or other such spacing) at the higher frequency, setting the resonance somewhere between the lower and higher frequency based on the desired efficiencies at the two frequencies Then the array is operated with the normal spacing at the higher frequency, and the lower frequency is operated by combining groups of adjacent elements into a single larger element. In example given below these elements are grouped via a system of switches.

One inventive aspect is a dual-frequency phased-array sonar transducer system comprising: a planar array of transducer elements; and a multiplexing circuit for selecting between a first state and a second state during either transmit operation, receive operation or both transmit and receive operation, the multiplexer configured to connect transducer elements to a plurality of connections different between the first state and second state, wherein the system is configured to transmit and receive beams at a first frequency when the multiplexer is in the first state and transmit and receive beams at a second frequency when the multiplexer is in the second state, and wherein the angle of the beams from vertical in the first and second state are substantially similar.

The two frequencies can be separated by approximately one octave.

The beams angles can be common between all beams and the beam angles are approximately 30° from vertical.

The beams angles can be common between all beams and the beam angles are approximately 20° from vertical.

The multiplexing circuit combines adjacent elements into a single effective element for the low-frequency state.

The phased-array transducer elements can be grouped into eight element types for each side of the transducer.

The inter-element spacing can be approximately one half wavelength at the high frequency.

Another aspect is a dual-frequency phased-array sonar system, comprising: a planar array of transducer elements; and means for multiplexing a plurality of connections from the array of transducer elements to transmit circuits, receive circuits, or transmit and receive circuits between a first state and a second state, wherein the effective inter-element spacing in at least one direction of the array of transducer elements is different between the first state and second state and the sonar system operates at a different frequency between the first state and second state.

The two frequencies can be separated by approximately one octave.

The beams angles can be common between all beams and the beam angles are approximately 30° from vertical.

The beams angles can be common between all beams and the beam angles are approximately 20° from vertical.

The phased-array transducer elements can be grouped into eight element types for each side of the transducer.

The inter-element spacing can be approximately one half wavelength at the high frequency.

The angle of the beams from vertical in the first and second state can be substantially similar.

DETAILED DESCRIPTION OF CERTAIN EMBODIMENTS

Figure 1:
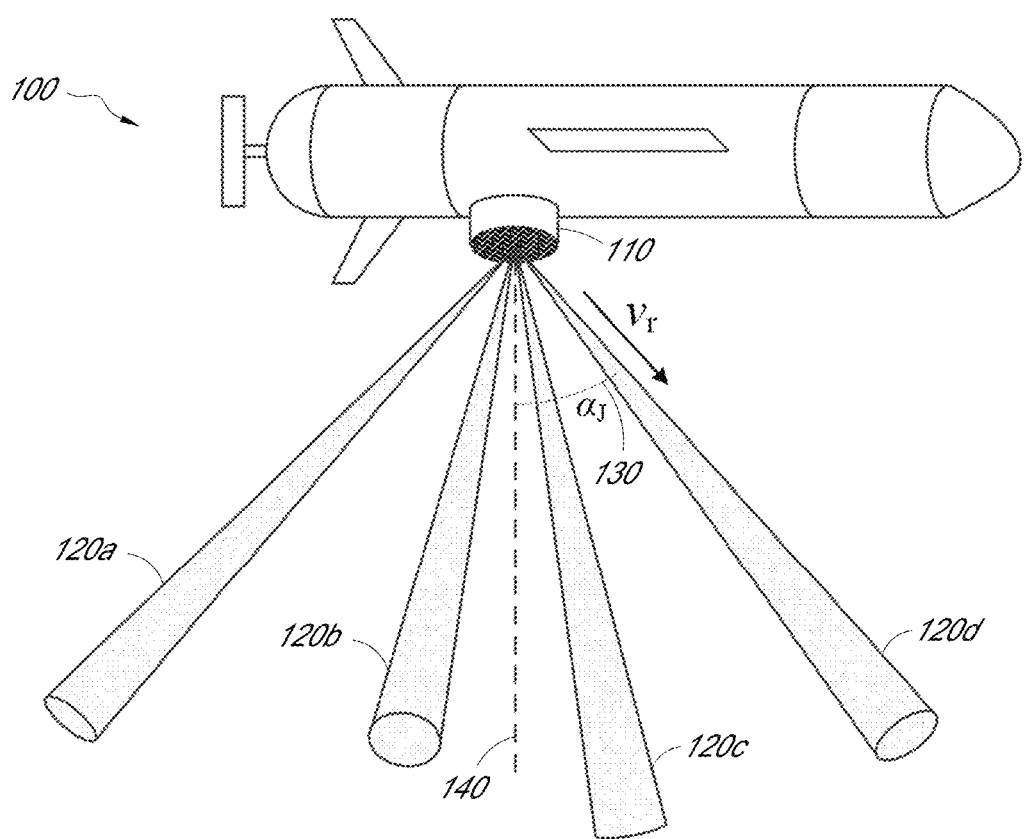
FIG. 1 is a diagram of an example Doppler sonar transmitting four beams in a Janus configuration.
Figure 2:
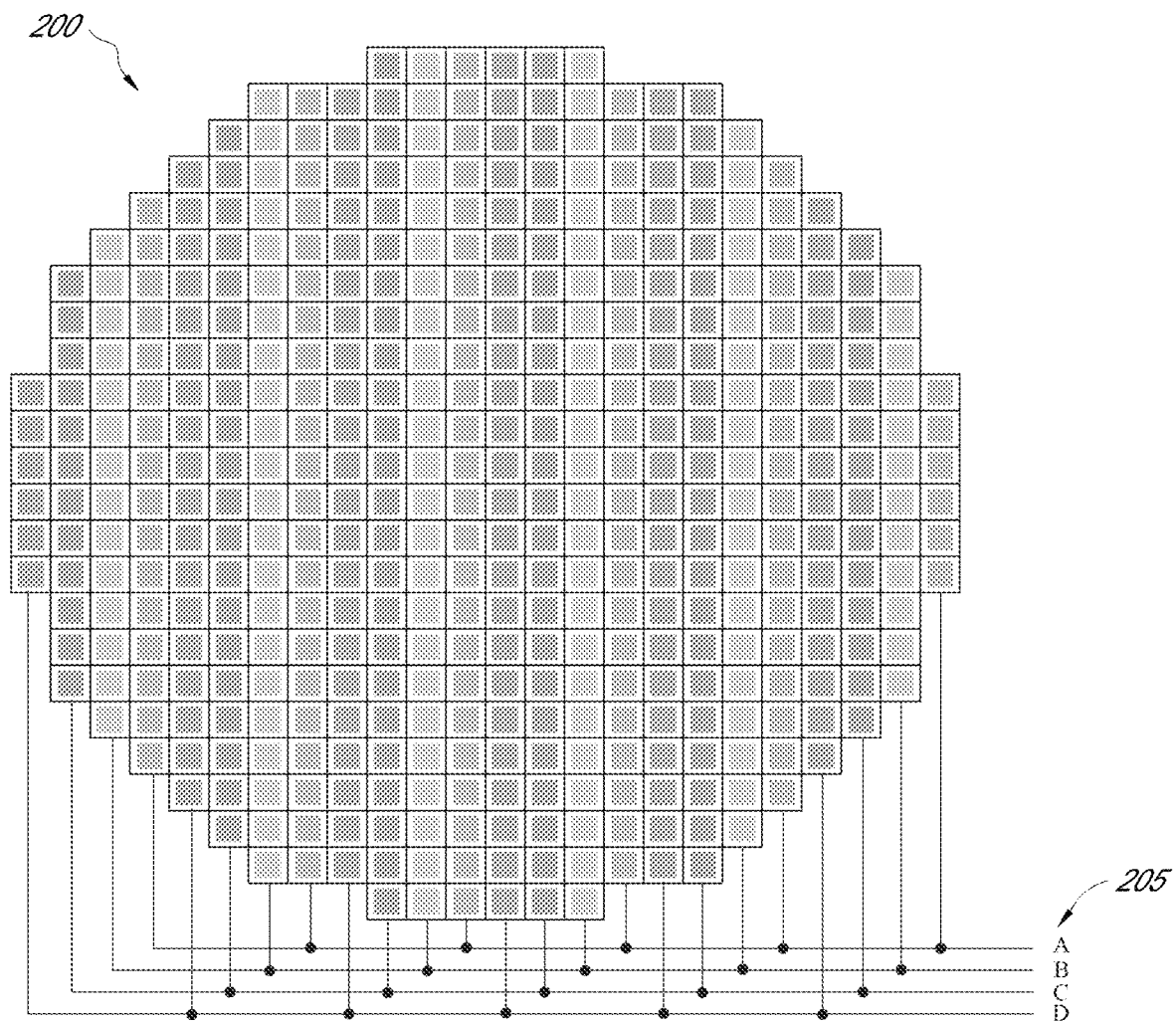
FIG. 2 is a two-dimensional diagram of a standard phased-array transducer with nominally 30° Janus angle.

The beam angle θ of a phased array is determined by the equation $$\theta = \sin^{-1}\left(\frac{\phi \lambda}{2\pi d}\right), \quad (3)$$

where $\phi$ is the phase difference between elements, $\lambda$ is the wavelength, and d is the element spacing. A standard configuration is to set the phase difference, $\phi$, to 90° ($\pi/2$ radians) and divide the array into four element types: A, B, C, and D, as shown FIG. 2. For element spacing $d_1=\lambda_1/2$, the nominal beam angle is $\theta_1=30°$. The corresponding frequency is $f_1=c/\lambda_1$, where c is the sound speed.

Figure 3:
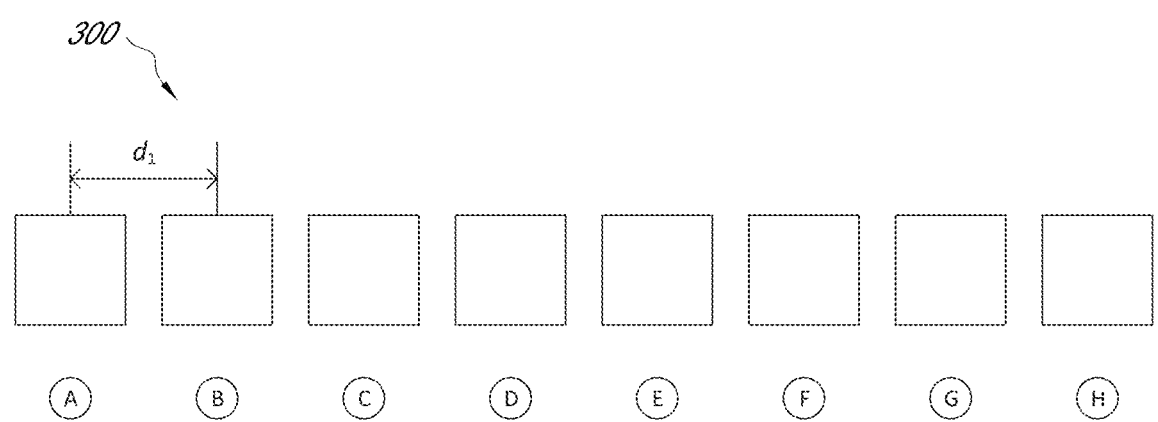
FIG. 3 is a one-dimensional diagram of a dual-frequency phase-array transducer operating at the high frequency.

In order to implement a dual-frequency phased-array transducer 300, there is a need to expand the four element types to eight types: A, B, C, D, E, F, G, and H, as shown along one dimension in FIG. 3. The element spacing of this expanded array is also $d_1$. To achieve beam angle $\theta_1=30°$ at frequency $f_1$, the required phase difference between the eight element types are 0°, 90°, 180°, 270°, 0°, 90°, 180°, and 270°, respectively. The phase wraps around the unit circle once for element types E, F, G, and H. Hence, this array with eight element types is functionally equivalent to the array with four element types, when operating in the high-frequency state.

Figure 4:
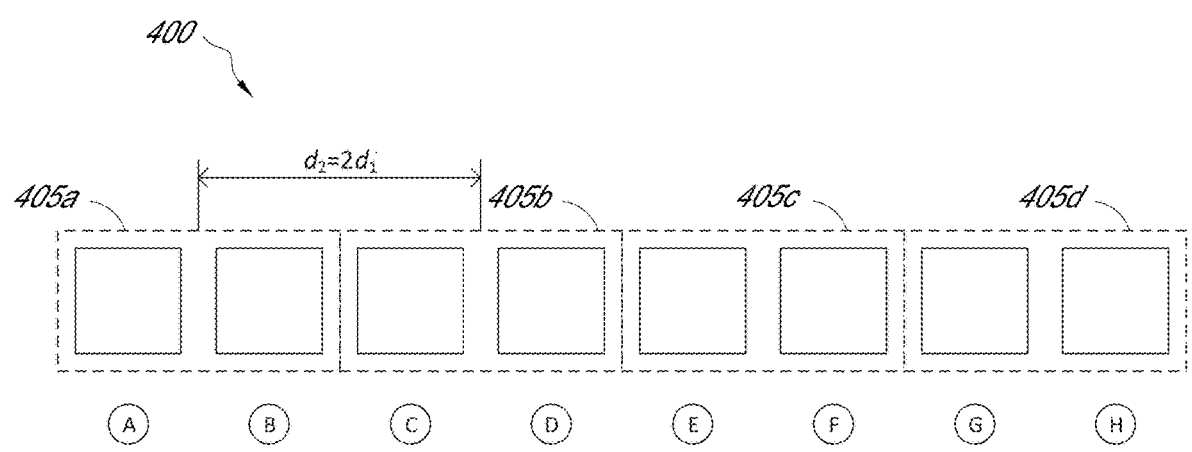
FIG. 4 is a one-dimensional diagram of a dual-frequency phase-array transducer operating at the low frequency.

If the frequency is halved, $f_2=f_1/2$, the wavelength increases by a factor of 2, $\lambda_2=2\lambda_1$. If the element spacing is also increased by a factor of 2, $d_2=2d_1$, as shown in the dual-frequency phased-array transducer 400 of FIG. 4, then the beam angle $\theta_2=\theta_1=30°$ does not change.

Figure 5:
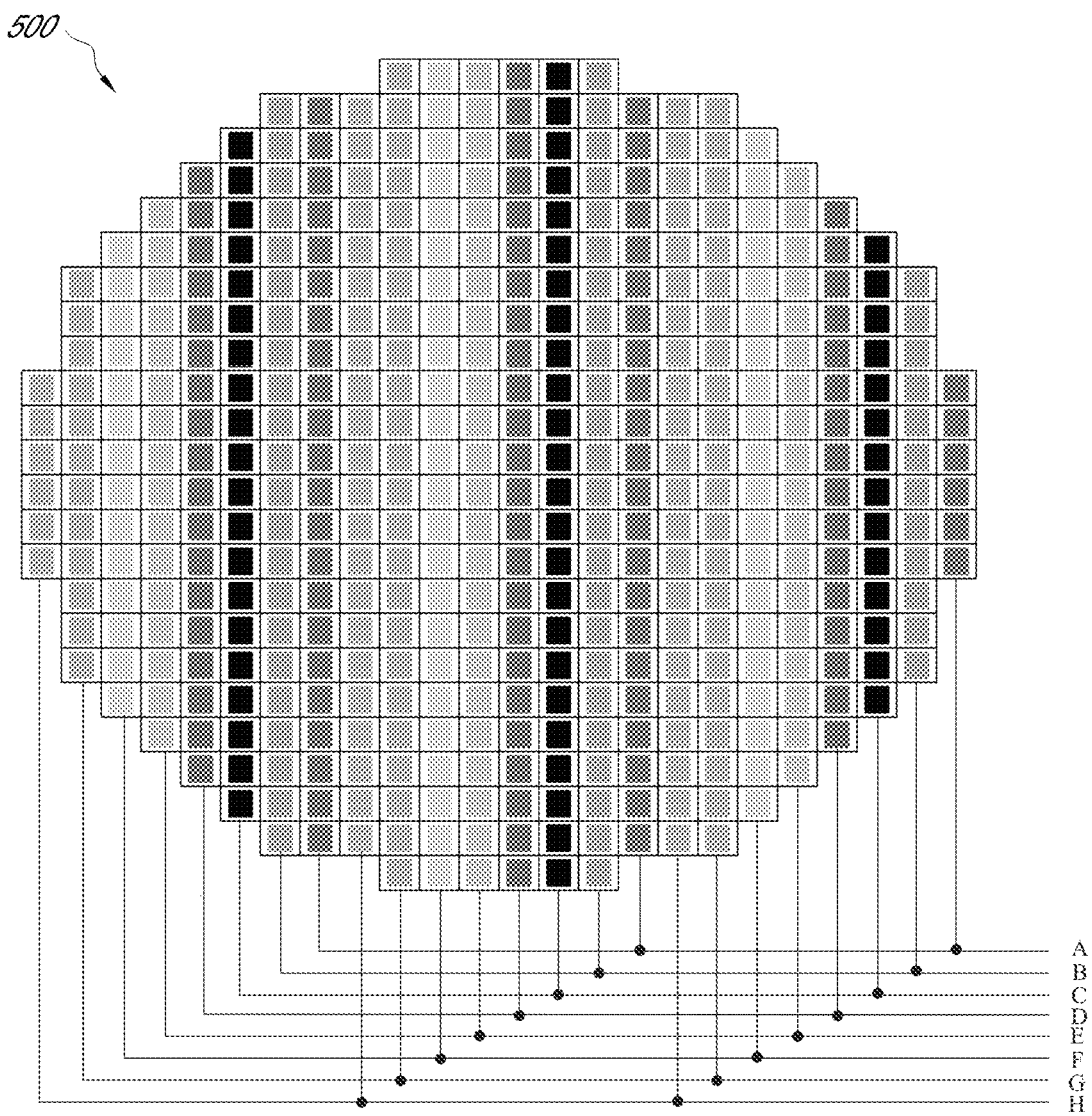
FIG. 5 is a two-dimensional diagram of a dual-frequency phased-array transducer with nominally 30° Janus angle.

To create a dual-frequency array, the physical array-element spacing needs to be set according to $d_1$, the spacing corresponding to the higher frequency. To operate the array in the low-frequency state, adjacent elements are combined into a single equivalent element 405a, 405b, 405c, 405d. A two-dimensional diagram of one side of a dual-frequency phased-array transducer 500 with eight element types that forms beams at 30° nominal Janus angle is shown in FIG. 5. A four-beam Janus configuration phased array consists of two groups of eight element types, wherein the two groups connect to opposite sides of the phased array 500 and the staves of the second side are rotated by 90° from the staves of the first side.

There exists a number of ways to connect the elements together through switches to realize the two different effective element spacing distances $d_1$ and $d_2$. One approach is shown in FIG. 6.

Figure 6:
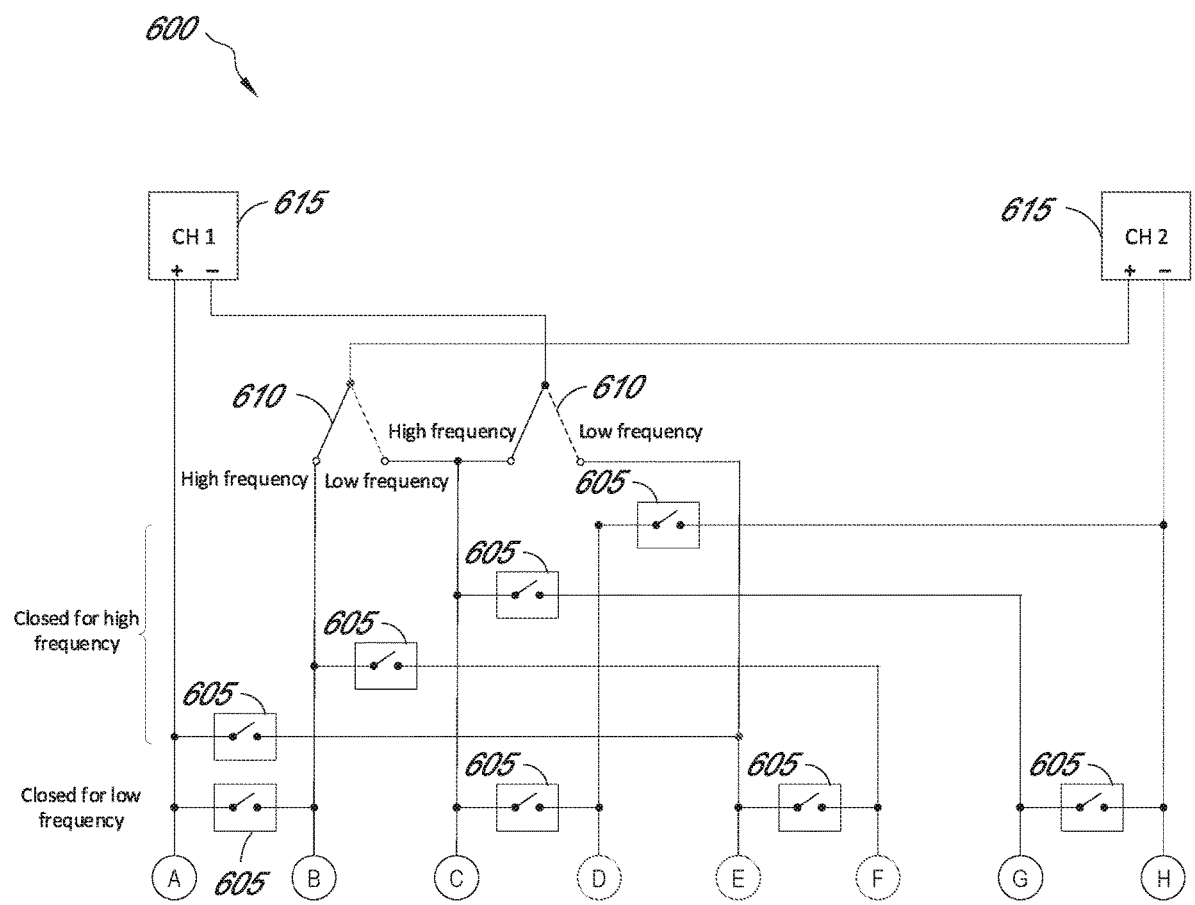
FIG. 6 is an example of one general implementation of switches to connect the phased-array staves to the receiver to implement dual-frequency operation.

The 30° beam-angle, dual-frequency phased-array transducer 600 embodiment in FIG. 6, wherein the frequencies are separated by one octave, comprises eight single-pole-single-throw switches 605, two single-pole-double-throw switches 610, and two transmit and receive channels 615 per side of the array. This particular embodiment shows how the element types are connected through switches 605, 610 to differential transmitter and receiver channels 615 and the positions of the switches 605, 610 when operating in the low-frequency and high-frequency states. Thus, the phased-array transducer 600 may function as a multiplexing circuit for selecting between a first state and a second state by connect transducer elements to a plurality of connections different between the first state and second state.

Any integer relationship between the two frequencies is possible by extending the methodology of grouping adjacent elements into larger groups of adjacent elements. Similarly, any beam angle is possible at the expense of additional hardware by changing the phase difference $\phi$ and increasing the number of element types output from the array.

In general, the dual-frequency phased array may have an element spacing and inter-element phase difference that provide a desired nominal beam angle. For example and as described above, the phased array may be configured with an element spacing of $d=\lambda/2$ and inter-element phase difference $\phi=90°$ to provide a nominal beam angle of $\theta=30°$. As another example, the phased array may be configured with an element spacing $d=\lambda/2$ and inter-element phase difference $\phi=60°$ to provide a nominal beam angle of approximately 19.5°.

As noted above, the beam angle of the dual-frequency acoustic phased array depends upon the wavelength of the operating frequency. Since the wavelength of the operating frequency varies with the speed of sound, variations in the speed of sound can induce variations in the beam angle.

Figure 11:
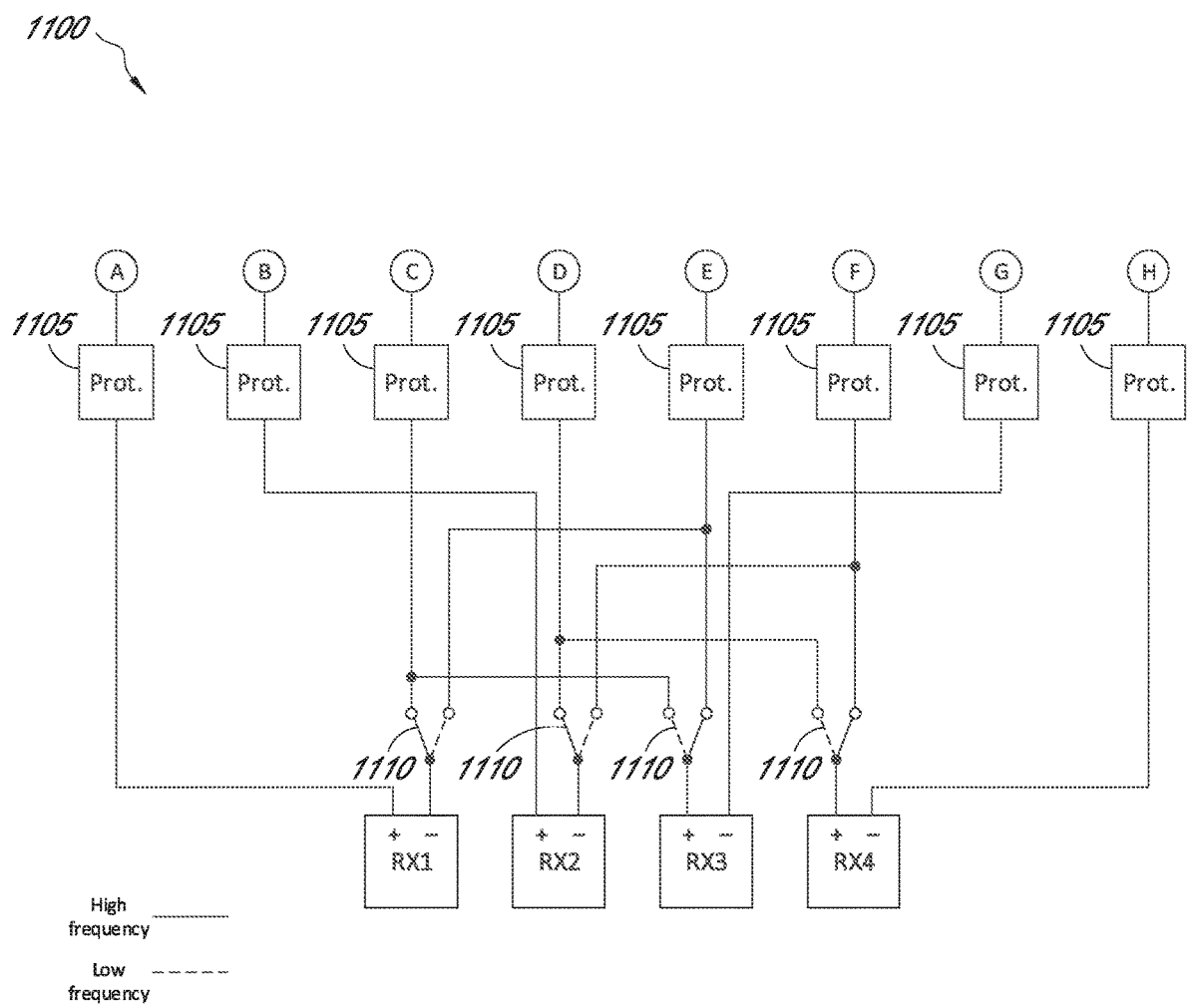
FIG. 11 is a specific example of how to connect receivers to the phased-array staves to implement dual-frequency receive operation.

One practical problem with using switches that are common to transmit and receive operation is the ability of the switches to withstand high-voltage transmit signals that are typical utilized in acoustic transducers to generate sufficient acoustic intensity within the beams. This problem can be solved by separating the transmit functionality from the receive functionality, as shown in FIG. 7 and FIG. 11.

Figure 7:
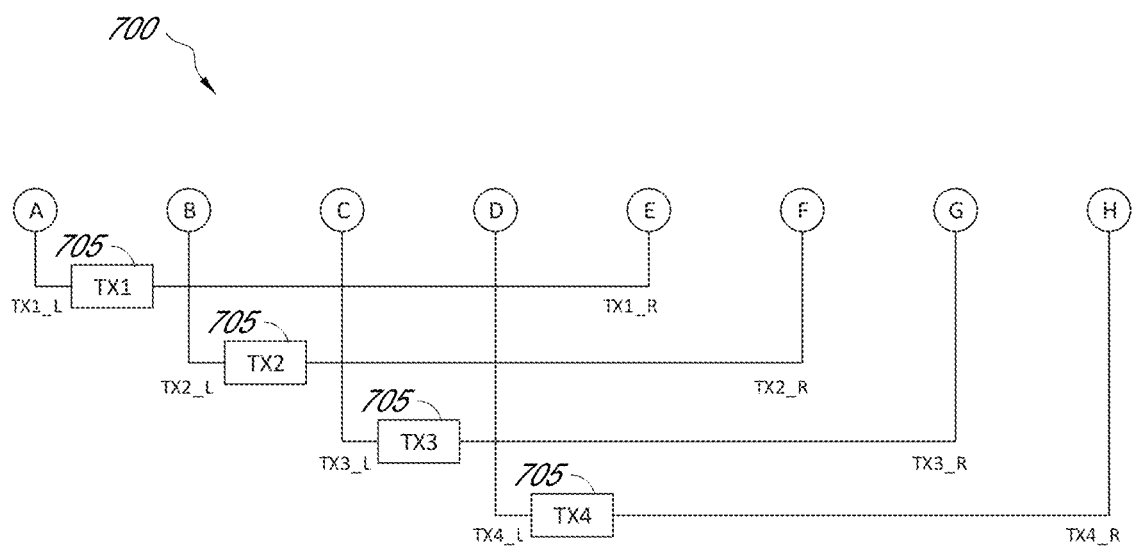
FIG. 7 is a specific example of how to connect full-bridge transmitters to the phased-array staves to implement dual-frequency transmit operation.

Four full-bridge transmitters 705 per side of the phase array 700 can generate the required waveforms to transmit Janus beams at 30° beam angle for two different frequencies approximately one octave apart, as shown in FIG. 7. A full-bridge transmitter 800 consists of four switches: two on the left side and two on the right side, wherein one side of the top left switch connects to constant voltage V and the other side connects to the left signal TX_L; one side of the bottom left switch connects to the left signal TX_L and the other side connects to ground GND; one side of the top right switch connects to constant voltage V and the other side connects to the right signal TX_R; and one side of the bottom right switch connects to the right signal TX_R and the other side connects to ground GND, as shown in FIG. 8.

Acoustic transducers are often driven with square waves to simplify the transmit circuitry and obtain high transmit efficiency associated with transistors operating in full saturation. The transducer acts as a filter and attenuates harmonics of the square wave transmit waveform such that the acoustic signal in the water mostly consists of the fundamental frequency.

Figure 8:
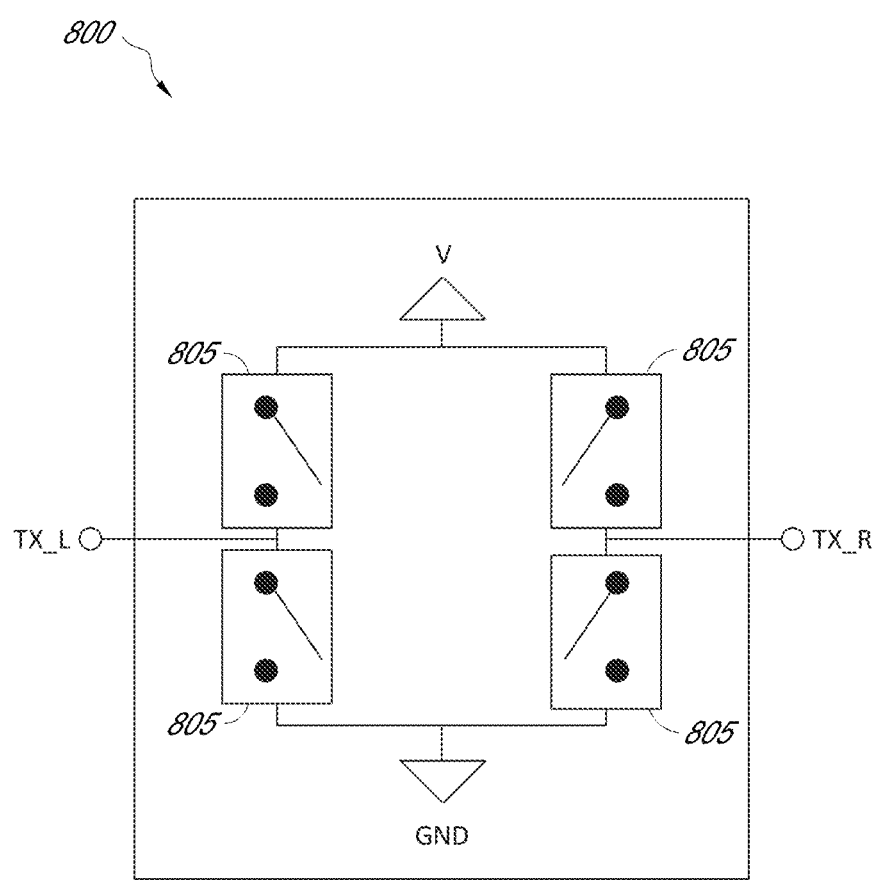
FIG. 8 is circuit diagram of a full-bridge transmitter.
Figure 9:
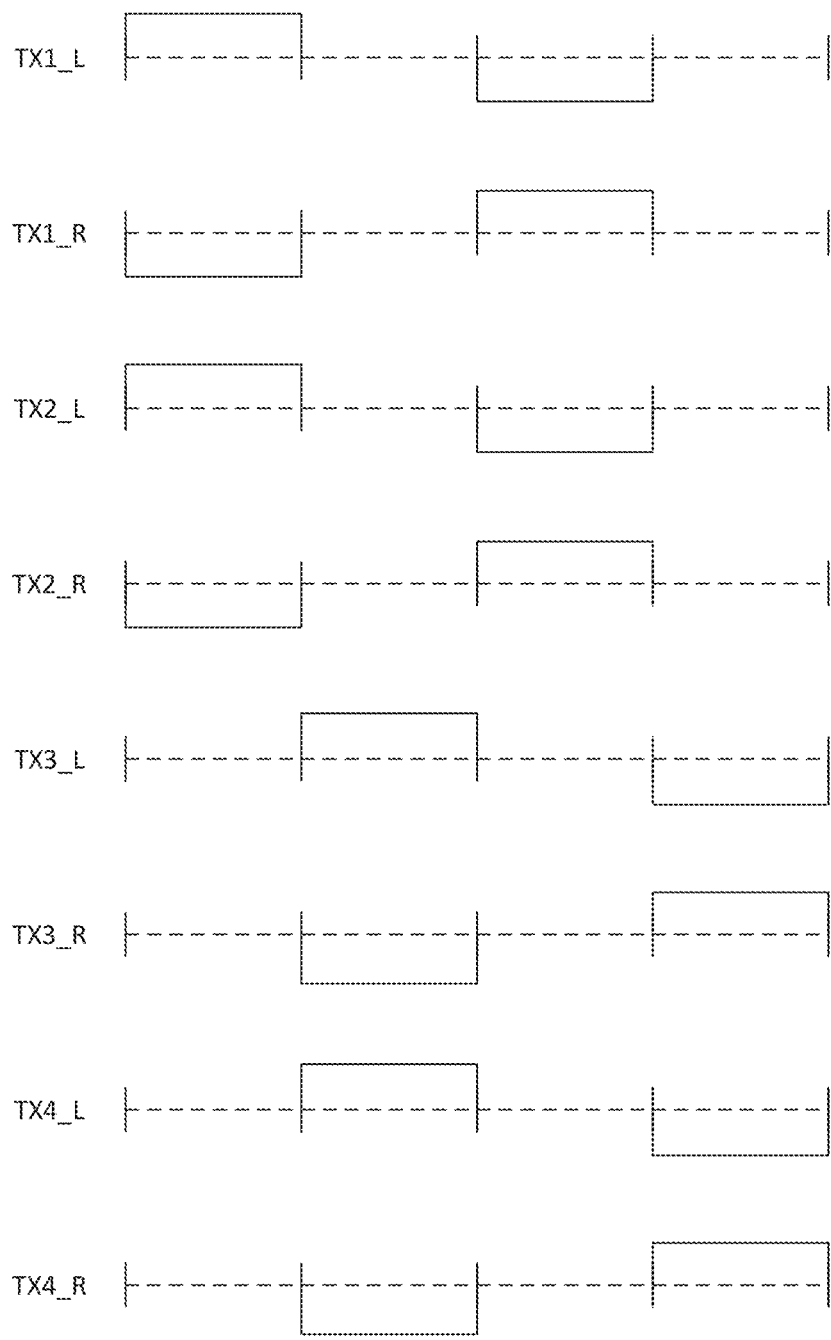
FIG. 9 is a set of example waveforms to transmit at the low frequency.
Figure 10:
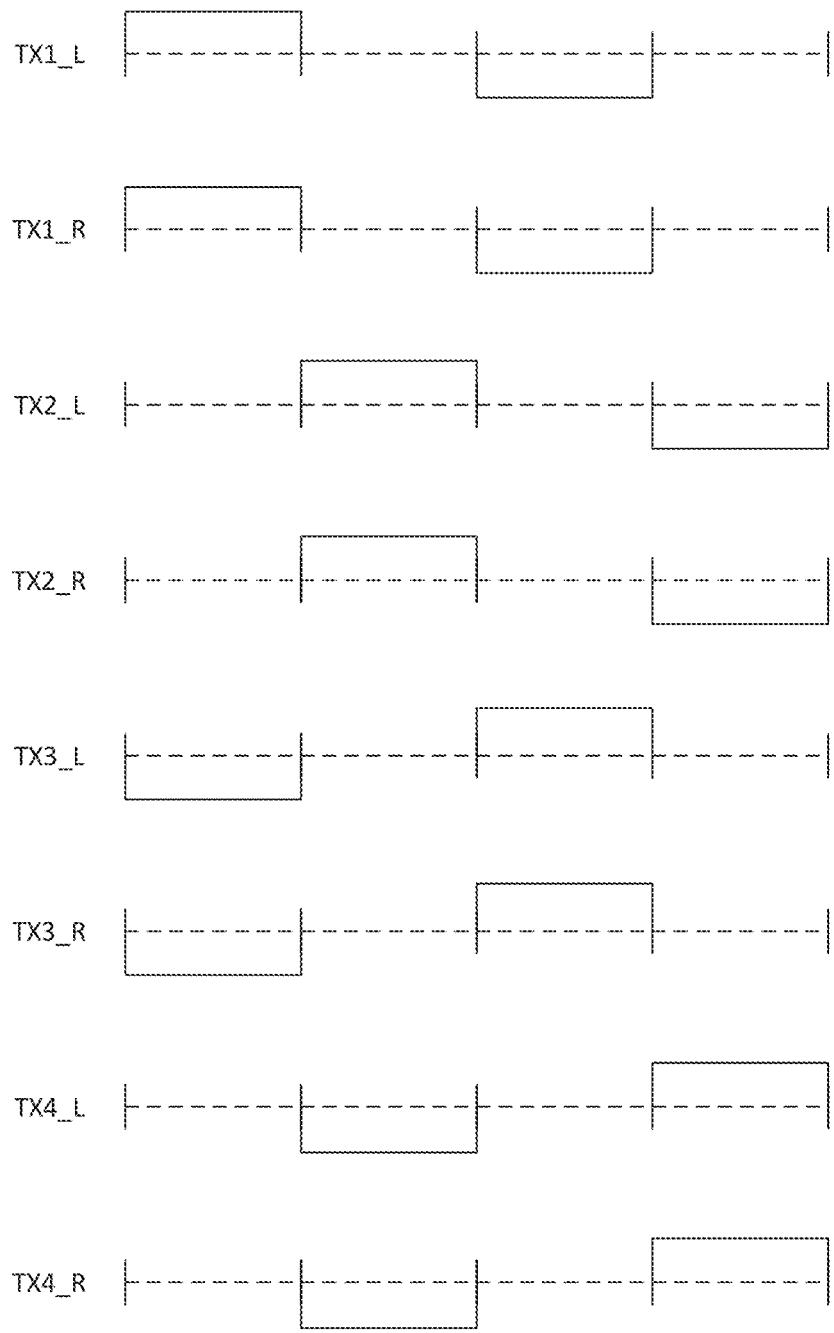
FIG. 10 is a set of example waveforms to transmit at the high frequency.

Example transmit waveforms, using the topology in FIG. 7 and FIG. 8, are shown in FIG. 9 and FIG. 10, for the low-frequency and high-frequency states, respectively. These examples correspond to beamforming of a single beam at beam angle $\theta=30°$ from one side of the phased array and 50% on-time duty cycle. One full cycle, corresponding to the period of the transmit frequency T=1/f is shown. The single quadrant shifts in time between TX1_L and TX3_L in FIGS. 9 and TX1_L and TX2_L in FIG. 10 correspond to an inter-element phase difference θ=90°. The waveforms can be altered to transmit multiple beams at a time, adjust the duty cycle, alter the beam angle, and/or the frequency.

High-voltage protection and switch circuitry 1100 for implementing one side of a 30° beam angle dual-frequency phase-array receiver is shown in FIG. 11. The protection circuitry 1105 protects the switches 1110 from high voltage during transmit and allows for utilizing compact switches 1110 that do not need to withstand high voltage. An example protection circuitry 1105 consists of an impedance element, such as an in-series capacitor, followed by back-to-back diodes to ground. Other protection circuits 1105 do exist; the preferred protection circuit 1105 depends on the specific application.

The position of the switches 1110 for the low frequency and high frequency states are indicated by dashed and solid lines in the single-pole-double-throw switches 1110.

Figure 12:
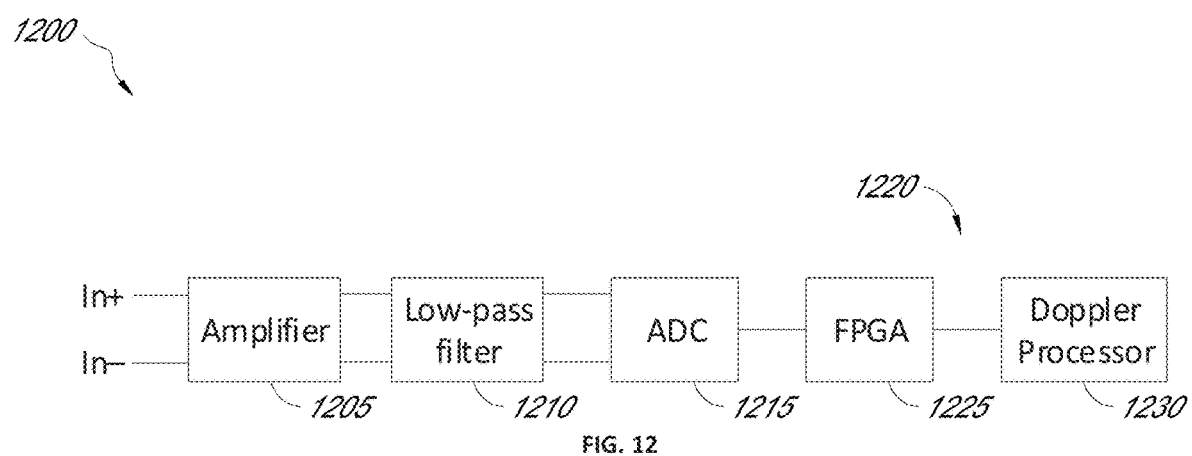
FIG. 12 is an example of a Doppler sonar receive path.

The output of the single-pole-double-throw switches 1110 are connected to four differential receivers RX1-RX4. An alternative implementation the uses two receivers and additional switches would also be possible. Single-ended receivers could also be used, but it may be advantageous to use differential receivers to reduce the required number of receivers. An example implementation of a receiver 1200 and downstream processing 1220 is shown in FIG. 12. Only one receiver 1200 is shown, but the system could contain any number of receivers 1200. The receiver 1200 in the example consists of a differential amplifier 1205, a low-pass filter 1210 performing anti-aliasing functionality and an analog-to-digital converter (ADC) 1215. Common components to all channels are the field programmable gate array (FPGA) 1225 that downconverts, filters, and decimates the sampled data from the ADCs and the Doppler processor 1230 that measures the Doppler shift and estimates the corresponding velocity. For the particular receiver implementation in FIG. 11, a pre-processing step may be implemented to form signals $s_0$ and $s_{90}$ by combining outputs of the receivers. The preprocessing step for the low-frequency state includes $s_0$=RX1+RX2 and $s_{90}$=RX3+RX4 and for the high-frequency state $s_0$=RX1+RX3 and $s_{90}$=RX2+RX4. This pre-processing step can be implemented in the digital domain in the FPGA 1225 or processor 1230 or in the analog domain in an alternative embodiment. Final beamforming is the performed by adding $s_0$ and $s_{90}$ with either of the two signals adjusted by a 90° phase shift, wherein the selection of signal to phase shift by 90° depends on which beam to generate. Other implementations of the receiver 1200 and processing path 1220 do exist; the example given in FIG. 12 just illustrates one possible partition of the receive 1200 and processing path 1220.

It may be beneficial to separate the two frequencies by a small amount from an exact octave, either slightly below or above an octave, to avoid poor response of the array at exactly twice the resonance frequency. The side effect from operating away form an octave is a small variation of the beam angles at the two frequencies, as predicted by the Equation (3). This deviation from nominal would be taken into account when estimating velocity using Equation (2).

As discussed above, the array element spacing may be set according to the high frequency, but the resonance of the array could be tuned closer to the low frequency, to increase and/or optimize the maximum range. The efficiency at the high frequency would therefore suffer to some degree, but probably not by more than 10 dB 1-way, equivalent to about 20% reduced range at the high frequency. This would not affect the performance much, since the instrument could switch over to the low frequency at the range when the signal-to-noise ratio at the high frequency becomes unfavorable. As examples, the lower operating frequency may be about 5% above or below an exact octave below the higher operating frequency, resulting in a relatively minor difference in beam angles between the lower and higher operating frequencies.

Figure 15:
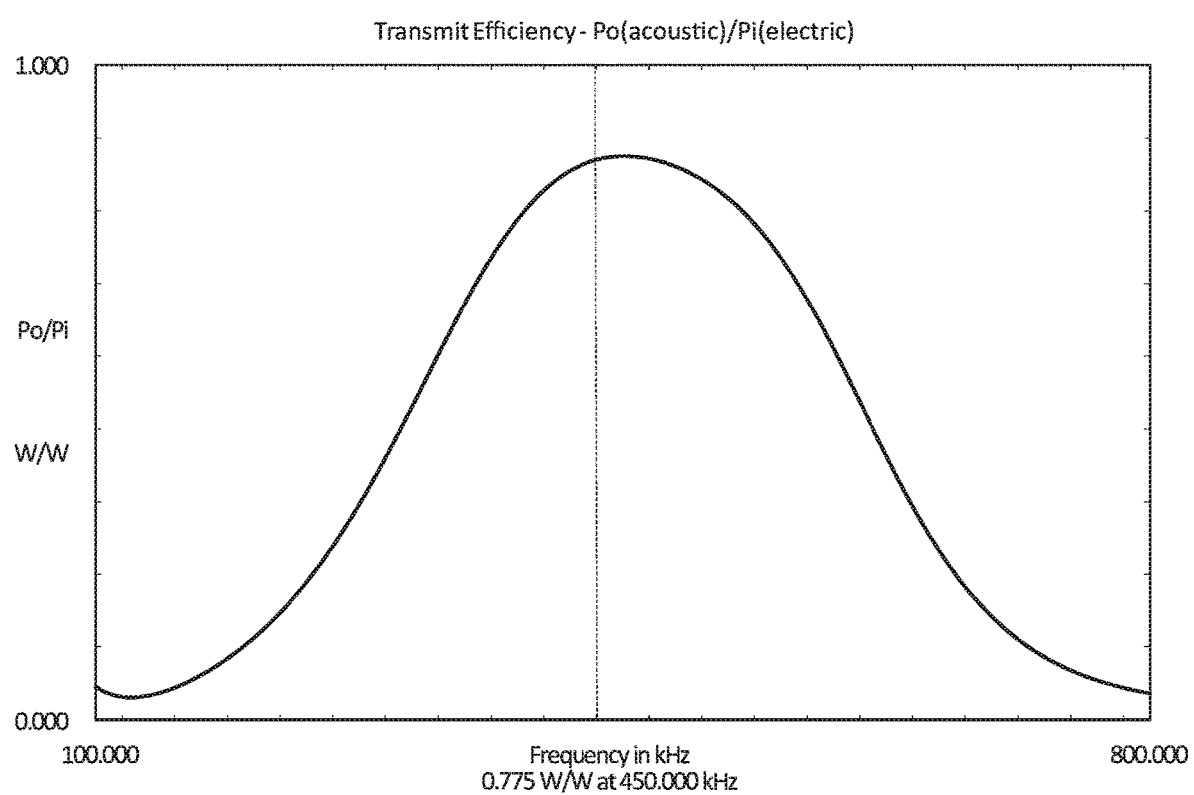
FIG. 15 is an example transmit-efficiency plot of efficiency versus frequency with the efficiency peak at the vertical cursor.

For a single-frequency phased-array application, the nominal acoustic frequency is typically selected such that it is close to the center of the efficiency peak to allow for a flat response within some desired bandwidth (see, e.g., FIG. 15, showing an acoustic transducer array having a peak transmission efficiency, acoustic power out divided by electric power in, of 77.5% at approximately 450 kHz). However, the efficiency peak may not be wide enough to accommodate two frequencies that are separated by an octave to both be within the peak. As discussed above, the lower frequency may be used for long-range profiling, therefore, it may be more important for the efficiency at the lower frequency to remain high as compared to the higher frequency if the goal is to maximize range. One aspect of the dual-frequency phased-array disclosed herein is to select the location of the lower frequency to be near the peak, but closer to the left edge, such that the higher frequency is still operating at an acceptable frequency. However, by placing the lower frequency towards the left side of the peak, the efficiency of the higher frequency is still kept clear of the region of anti-resonance, which would not be the case if the lower frequency was located at the center of the efficiency peak, as is typically done for a standard phased array.

Figure 13:
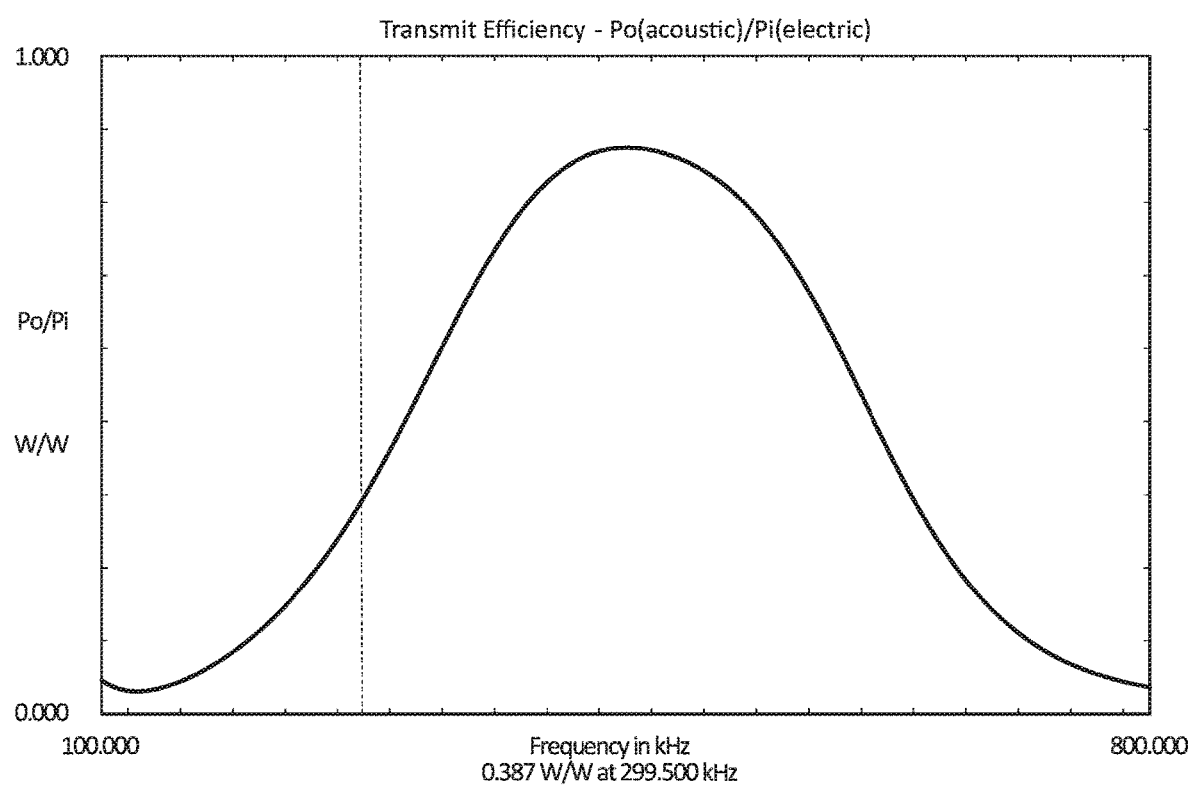
FIG. 13 is an example transmit-efficiency plot of efficiency versus frequency with the efficiency peak at a higher frequency than the vertical cursor.
Figure 14:
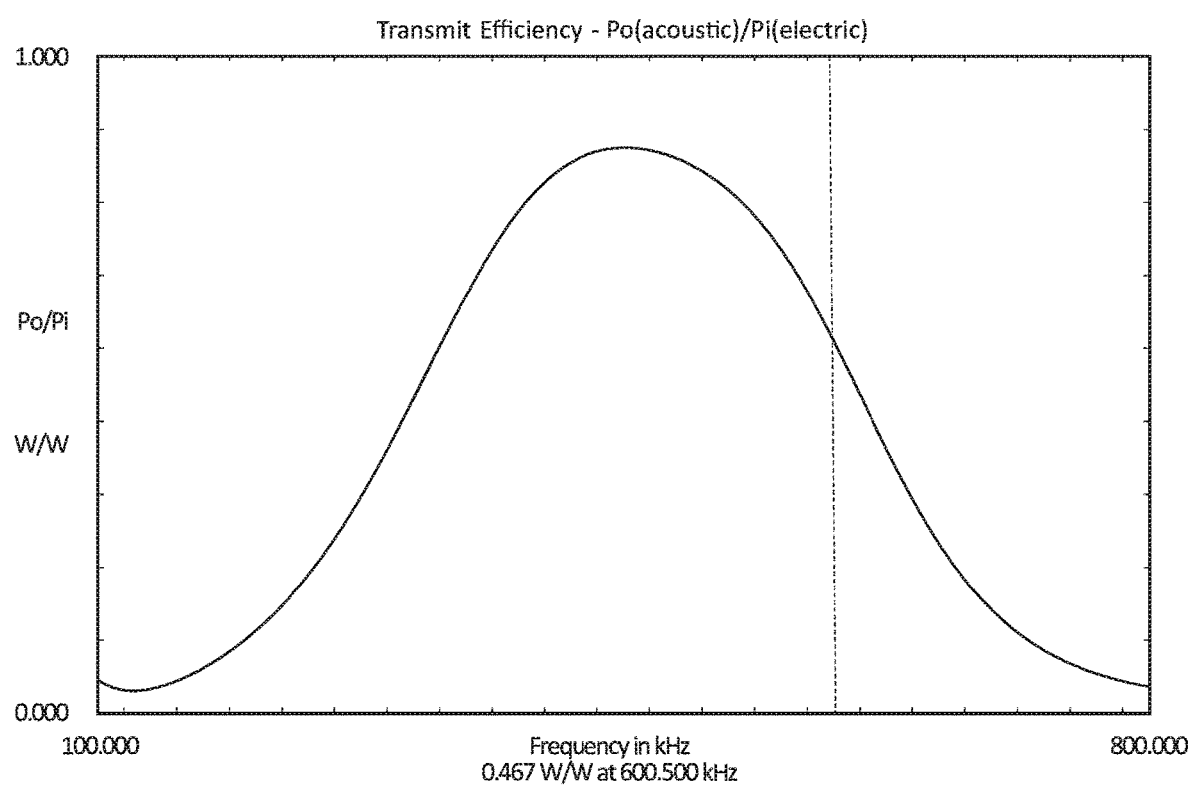
FIG. 14 is an example transmit-efficiency plot of efficiency versus frequency with the efficiency peak at a lower frequency than the vertical cursor.

Another strategy could be to strive for near equal efficiency at the two frequencies. Typical transmit-efficiency as a function of frequency for a phased-array transducer is shown in the three plots 1300, 1400, and 1500 of FIGS. 13, 14, and 15. The plot 1500 in FIG. 15 contains a vertical dashed line showing efficiency at 450 kHz—the center frequency between an example 300-600 kHz pair, the plot 1300 in FIG. 13 contains a vertical dashed line at 300 kHz, and the plot 1400 in FIG. 14 contains a vertical dashed line at 600 kHz. The efficiency at both 300 kHz and 600 kHz are similar by designing transducers that are tuned with a peak efficiency in between the two desired operating frequencies. Using this strategy, the average efficiency at both frequencies can be made higher than if the efficiency peak was coincident with either of the two frequencies. As shown in FIG. 13, the efficiency of the dual-frequency phased-array may be approximately 38.7% at approximately 300 kHz. As shown in FIG. 14, the efficiency of the phased array may be approximately 46.7% at 600 kHz. This represents only about a 2.6 dB loss 1-way for each frequency, resulting in only a minor loss in range if system power usage is not a major concern.

A dual-frequency phased array would be beneficial for both bottom track and water profiling. For water profiling, higher frequency is better for bins close to the instrument, from a standpoint of improved tradeoff between variance, spatial resolution, and temporal resolution. The lower frequency is advantageous to improve the maximum range of the profile. Hence, the use of a dual-frequency phased array, would allow for combining the advantages of high and low frequencies.

For bottom track, higher frequency allows for lower minimum altitude, while lower frequency allows for higher maximum altitude. Additionally, a phased array sized for the lower frequency, has an apparent aperture (as measured in wavelengths) that is twice as large at the higher frequency, resulting in a very narrow beam width. This is desirable, because the long-term velocity error is inversely related to the beam width.

As an example, a 300 and 600 kHz dual-frequency phased-array DVL, with a 12-cm transducer diameter, is expected to operate from a minimum altitude of 0.15 m or less to a maximum altitude of 400 m or more, using a narrow signal bandwidth for bottom track. The long-term accuracy is expected to be ±0.1% at altitudes up to 70 m and ±0.3% beyond 70 m.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present development.

The various illustrative logical blocks, modules, and circuits described in connection with the examples disclosed herein may be implemented or performed with a general purpose processor, a digital signal processor (DSP), an application specific integrated circuit (ASIC), an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be connected to the processor such that the processor can read information from, and write information to, the storage medium. In the alternative, the storage medium may be integral to the processor. The processor and the storage medium may reside in an ASIC.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, rather than sequentially.

The previous description of the disclosed examples is provided to enable any person skilled in the art to make or use the present development. Various modifications to these examples will be readily apparent to those skilled in the art, and the generic principles defined herein may be applied to other examples without departing from the scope of the development. As will be recognized, certain embodiments of the developments described herein can be embodied within a form that does not provide all of the features and benefits set forth herein, as some features can be used or practiced separately from others. Thus, the present development is not intended to be limited to the examples shown herein but is to be accorded the widest scope consistent with the principles and novel features disclosed herein.

For purposes of summarizing the development and the advantages achieved over the prior art, certain objects and advantages of the development have been described herein above. Of course, it is to be understood that not necessarily all such objects or advantages may be achieved in accordance with any particular embodiment of the development. Thus, for example, those skilled in the art will recognize that the development may be embodied or carried out in a manner that achieves or optimizes one advantage or group of advantages as taught or suggested herein without necessarily achieving other objects or advantages as may be taught or suggested herein.

What is claimed is:

1. A dual-frequency phased-array sonar transducer system, comprising:
   a planar array of transducer elements; and
   a multiplexing circuit for selecting between a first state and a second state during either transmit operation, receive operation or both transmit and receive operation, the multiplexer configured to connect transducer elements to a plurality of connections different between the first state and second state,
   wherein the system is configured to transmit and receive beams at a first frequency when the multiplexer is in the first state and transmit and receive beams at a second frequency when the multiplexer is in the second state, and
   wherein the angle of the beams from vertical in the first and second state are substantially similar.

2. The system of claim 1, wherein the two frequencies are separated by approximately one octave.

3. The system of claim 1, wherein the beams angles are common between all beams and the beam angles are approximately 30° from vertical.

4. The system of claim 1, wherein the beams angles are common between all beams and the beam angles are approximately 20° from vertical.

5. The system of claim 1, wherein the multiplexing circuit combines adjacent elements into a single effective element for the low-frequency state.

6. The system of claim 1, wherein the phased-array transducer elements are grouped into eight element types for each side of the transducer.

7. The system of claim 1, wherein the inter-element spacing is approximately one half wavelength at the high frequency.

8. A dual-frequency phased-array sonar system, comprising:
   a planar array of transducer elements; and means for multiplexing a plurality of connections from the array of transducer elements to transmit circuits, receive circuits, or transmit and receive circuits between a first state and a second state, wherein the effective inter-element spacing in at least one direction of the array of transducer elements is different between the first state and second state and the sonar system operates at a different frequency between the first state and second state.

9. The system of claim 8, wherein the two frequencies are separated by approximately one octave.

10. The system of claim 8, wherein the beams angles are common between all beams and the beam angles are approximately 30° from vertical.

11. The system of claim 8, wherein the beams angles are common between all beams and the beam angles are approximately 20° from vertical.

12. The system of claim 8, wherein the phased-array transducer elements are grouped into eight element types for each side of the transducer.

13. The system of claim 8, wherein the inter-element spacing is approximately one half wavelength at the high frequency.

14. The system of claim 8, wherein the angle of the beams from vertical in the first and second state are substantially similar.

* * * * *